May 5, 1959 H. C. SMITH 2,885,477

EXCLUSION ARRANGEMENT FOR LOUDSPEAKING TELEPHONE SYSTEMS

Filed Oct. 8, 1956 4 Sheets-Sheet 1

INVENTOR.
HARRISON C. SMITH
BY Wm. Walter Owen
ATTY.

EXCLUSION ARRANGEMENT FOR LOUDSPEAKING TELEPHONE SYSTEMS

Filed Oct. 8, 1956

4 Sheets-Sheet 2

*INVENTOR.*
HARRISON C. SMITH

*BY* Wm. Walter Owen

ATTY.

EXCLUSION ARRANGEMENT FOR LOUDSPEAKING TELEPHONE SYSTEMS

Filed Oct. 8, 1956 4 Sheets-Sheet 3

INVENTOR.
HARRISON C. SMITH
BY [signature]
ATTY.

EXCLUSION ARRANGEMENT FOR LOUDSPEAKING TELEPHONE SYSTEMS

Filed Oct. 8, 1956 4 Sheets-Sheet 4

130

SUBSTATION ARRANGED FOR SELECTIVE LOUDSPEAKING SERVICE

INVENTOR.
HARRISON C. SMITH
BY [signature]
ATTY.

United States Patent Office 2,885,477
Patented May 5, 1959

2,885,477

EXCLUSION ARRANGEMENT FOR LOUD-SPEAKING TELEPHONE SYSTEMS

Harrison C. Smith, Wheaton, Ill., assignor to General Telephone Laboratories, Incorporated, a corporation of Delaware Application October 8, 1956, Serial No. 614,608

6 Claims. (Cl. 179—1)

The invention relates to loudspeaking telephone systems. More particularly, the invention relates to systems of this kind which are arranged both for "distant-talking" by means of a microphone and loudspeaker and for regular or "close-range" communication by means of a handset. Such systems are provided with manual switching means, for example, a pair of push buttons, for selectively transferring the subscribers line from one type of service to the other.

When such a selective loudspeaking system is set up for loudspeaking operation or "distant-talking" the users hands are free, that is, while he is carrying on his conversation by way of the microphone and loudspeaker, he may take notes or go through papers on his desk without having to hold the handset. Another advantage of loudspeaking service is that it enables a number of persons gathered around a desk or a conference table to participate in the conversation with the party at the other end.

During a conference of this sort it may at times become desirable to prevent the party at the other end of the connection from overhearing what is said in the conference room. Simply switching back from distant-talking to handset operation would not be a fully satisfactory method of providing the desired secrecy under this condition. If this were done someone would again have to hold the handset. Furthermore, it is well-known that secrecy cannot be insured in this manner even though the receiver is pressed against the ear and the mouth-piece of the transmitter covered with the hand. Also, with the line switched back to the handset, only the one person holding the handset would be able to hear what the party at the other end might be saying at this time while the other persons around the desk or table, although perhaps equally interested in this information, would be kept from receiving it.

It is accordingly an object of the present invention to provide novel and improved means for temporarily preventing voice signals from being transmitted to the other end while the system is set up for loudspeaking operation.

Another object of the invention is to bring this result about without the provision of additional manual switching means in the system.

According to its principal feature the invention visualizes an arrangement whereby the manual switch which upon actuation causes the system to be transferred from handset operation to loudspeaking operation is also effective while actuated to disable the microphone.

Two embodiments of the invention will be described hereinafter. In the first embodiment, a pair of push buttons, designated "On" and "Off," which when momentarily depressed act to switch the system from handset operation to distant-talking operation and back, are mounted, together with an "On" indicating lamp and a volume control potentiometer, in a small microphone cabinet which is separate from the subset but may also be placed on the user's desk. The telephone set itself may be of any conventional single-line or multi-line (intercom) type. In connection with this feature reference is made to copending application Serial No. 614,221 filed by E. S. Peterson on October 5, 1956, in which a system of this kind has been described and claimed.

In the second embodiment the invention is shown incorporated in a selective loudspeaking system using a substation especially designed for this kind of operation. This dual-service telephone set thus mounts, in addition to the conventional substation equipment, the "On" and "Off" transfer buttons as well as the indicating lamp and the volume control potentiometer.

In both embodiments there is further provided a loudspeaker and also an auxiliary cabinet which houses the remaining equipment needed for loudspeaking operation, such as the microphone amplifier and the speaker amplifier together with their power supply, the hybrid system and a transfer relay. This miscellaneous-equipment cabinet may be mounted out of sight, for instance underneath the desk; it is interconnected with the subset and the remaining cabinet or cabinets by means of cables.

The circuit design of the miscellaneous-equipment cabinet is the same for both embodiments. More particularly, the circuit arrangement is such that the transfer relay upon momentary depression of the "On" button, in addition to the other switching functions of this relay, places the line connected to the subset or, in the case of an intercom telephone, the line selected by actuation of a pick-up key, in circuit with the hybrid system in series with the subset dial. In both embodiments the "On" button has an additional pair of make springs which short-circuit the microphone whenever and as long as this button is depressed.

The invention, both as to its organization and method of operation, together with other objects and features thereof, will best be understood by reference to the following specification taken in connection with the accompanying drawings. In these drawings:

Fig. 5 shows the circuit of a substation which itself is especially arranged for selective loudspeaking service and which may be used in conjunction with the miscellaneous-equipment unit, Fig. 4.

Before the operation of the loudspeaking telephone system shown in Figs. 1–4 is described in detail, a brief explanation will first be given of the apparatus used in this system.

Figure 1:
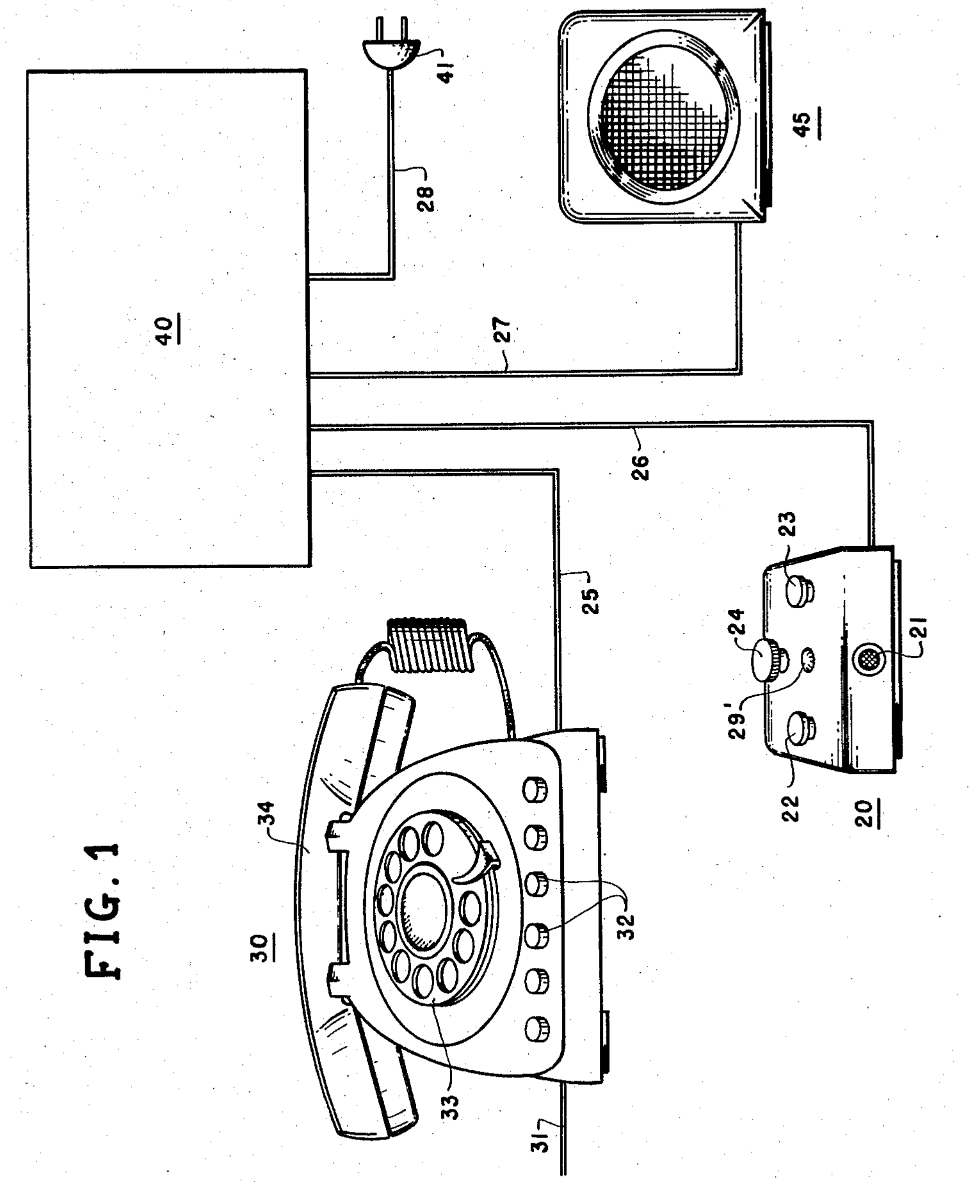
Fig. 1 is the schematic diagram of a selective loudspeaking system according to the first embodiment in which the manual transfer switches are mounted, together with the microphone, in a separate control unit.

Referring to Fig. 1 there is shown a typical key type or inter-communicating telephone substation 30 having a handset 34 and a dial 33. Below dial 33 there is provided a row of push keys 32 by means of which the subscriber at this substation may select any of the lines connected to this station by way of cable 31. These lines may be of any type, for instance, they may be inter-com lines, subscriber lines connected to a private automatic exchange, trunks to a main exchange, private lines, etc. In addition the row of keys 32 may include keys for special services, for example, a hold key, an exclusion key or the like.

Substation 30 is further connected by way of a small cable 25 with a miscellaneous-equipment unit 40 which preferably is mounted out of sight, for example, underneath the user's desk. Also connected with unit 40, namely via cable 26, is a small control unit 20 which may be placed next to subset 30 on top of the subscriber's desk. This control unit mounts in its front portion a microphone 21 and in its top portion an "On" button 22, an "Off" button 23 and a volume control 24. Behind aperture 29' in the top panel of control unit 20 there is mounted a pilot lamp, designated 29 in Fig. 2, for indicating the "On" condition of the system, that is, the condition in which the system is set up for loudspeaking operation. There is finally provided a loudspeaker 45 which is connected to miscellaneous-equipment unit 40 through a cable 27. Preferably control unit 20 and speaker 45 are placed on the desk in such a position relative to each other that the axis of the microphone is at a substantially right angle to that of the loudspeaker. In this way acoustic feedback between microphone and loudspeaker are minimized. Cable 28 which is terminated by plug 41 serves to connect miscellaneous-equipment unit 40 to a source of commercial alternating current.

Figures 2, 3:
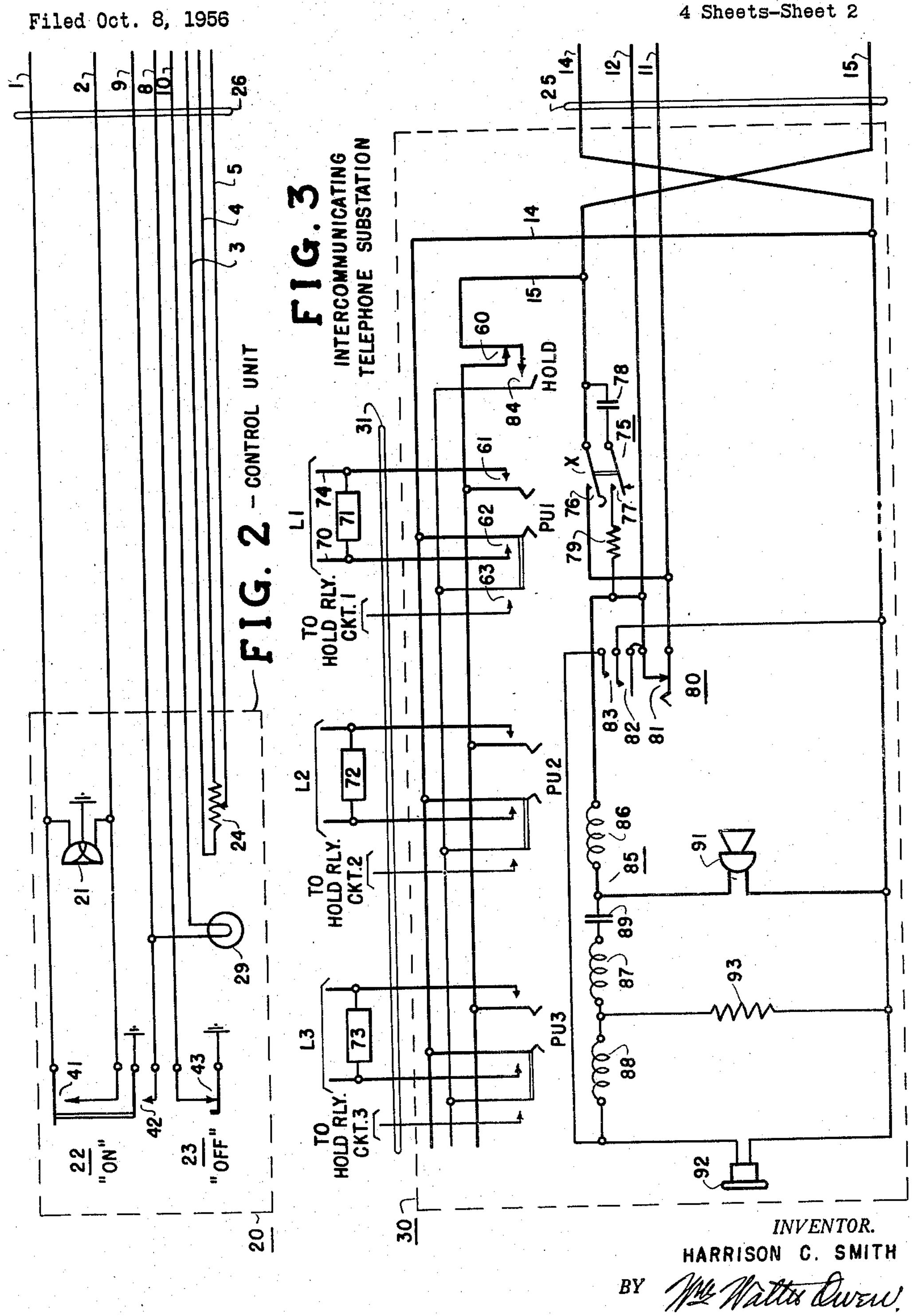
Fig. 2 shows the circuit of this control unit itself.
Fig. 3 shows the circuit of a typical key-type intercommunicating telephone substation in conjunction with which the control unit according to Fig. 2 may be used.

In Fig. 2 which shows the circuit of control unit 20 reference character 21 again designates the microphone, 22 the "On" button, 23 the "Off" button and 24 the volume control potentiometer while 29 is the indicating lamp.

Fig. 3 illustrates the circuit of the intercommunicating or multi-line telephone substation 30 of Fig. 1. This substation circuit includes the usual switchhook 75, dial 80, anti-sidetone induction coil 85, balancing resistance 93, transmitter 91 and receiver 92, this transmitter and receiver being mounted at the two ends, respectively, of handset 34, Fig. 1. As far as the foregoing components are concerned the substation circuit is the same as that disclosed in patent application Serial No. 592,401, filed by Harold C. Pye on June 19, 1956. Line equalizing means have been omitted in Fig. 3 as they have no bearing on the present invention.

While the instant invention may be practiced with an individual-line substation of this type, three lines have been shown connected to the substation, Fig. 3, in the usual manner. Bridged across each of these lines L1, L2, and L3 there is shown a corresponding ringing signal receiving circuit 71, 72 and 73. Since such circuits are well-known in the art and since their details are without relevance to the present invention these details have not been illustrated in Fig. 3. Associated with each line there is a pick-up key PU1, PU2, and PU3 respectively. It is assumed that these pick-up keys are mechanically interlocked with each other so that as each pick-up key is depressed the previously actuated pick-up key is automatically released, and it is further assumed that there is no mechanical interlock between these pick-up keys and the switchhook. A non-locking Hold key, Fig. 3, may be provided if it is desired to hold a line or trunk while a connection is being set up over another line. All three lines have been shown arranged for this holding service in Fig. 3 but it will be understood that different types of special services could be provided on the various lines if desired.

Figure 4:
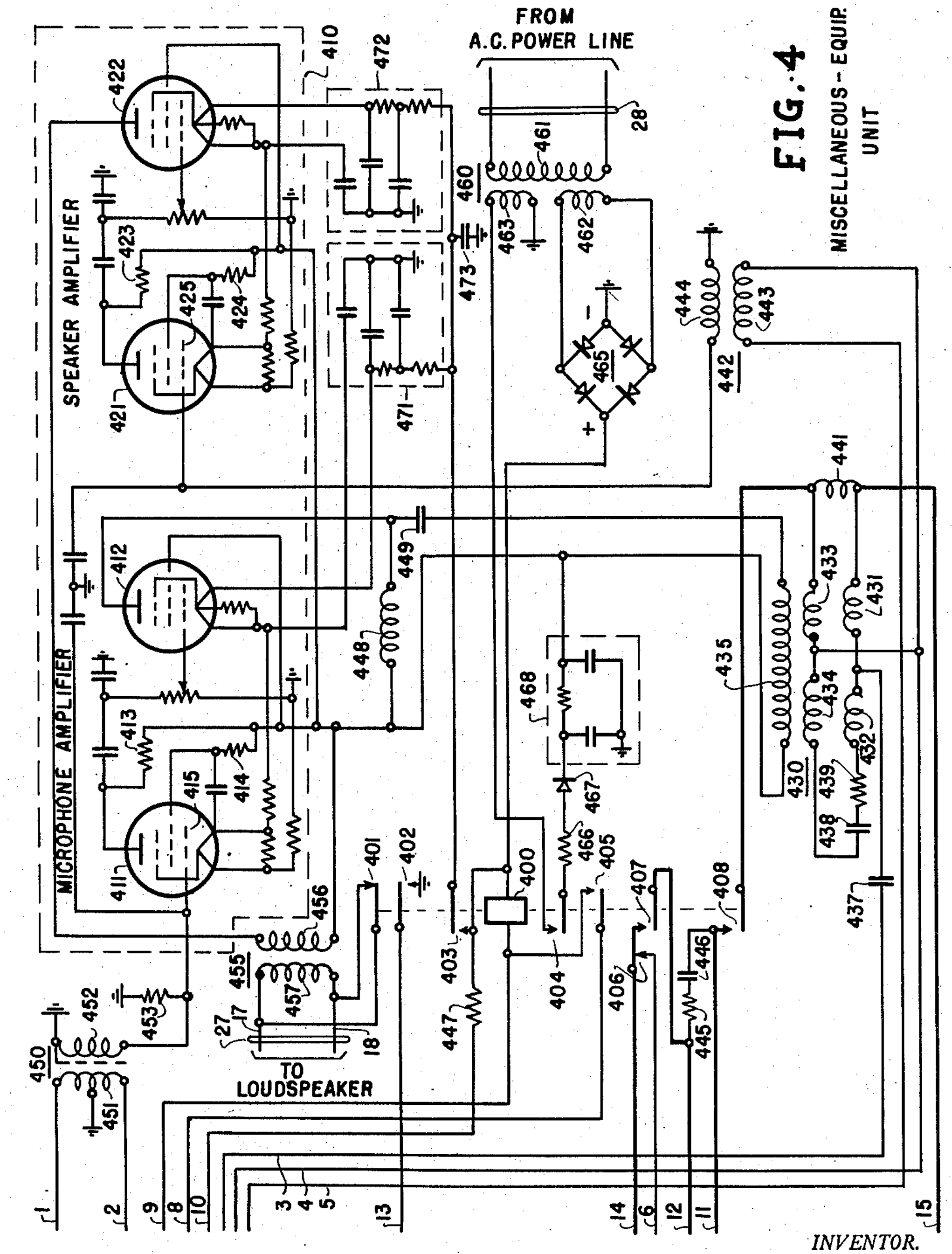
Fig. 4 shows the circuit of the miscellaneous-equipment unit.

The miscellaneous-equipment unit illustrated in Fig. 4 includes as its principal components a microphone amplifier and a speaker amplifier both these amplifiers being mounted on a printed circuit card 410; a power supply for these amplifiers including power transformer 460, plate voltage rectifier 467 and associated filter 468; filament voltage supply rectifier 465 and two separate filters supplied from this rectifier, namely filter 471 for supplying the microphone amplifier with a filtered filament voltage and filter 472 for supplying the speaker amplifier with a filtered filament voltage; the hybrid system including hybrid transformer 430, balancing network 438, 439 and choke 441; input transformer 450 for the microphone amplifier and input transformer 442 and output transformer 455 for the speaker amplifier; and finally a switching relay 400.

Each of the two amplifiers consists of two pentodes of the miniature, directly heated type. Due to the negligible warm-up time required by these tubes it is not necessary to leave the filament of these amplifiers under current all the time; that is, as explained in greater detail hereinafter, it becomes possible to turn the filament power for these amplifiers on only while they are actually used. The employment of such directly-heated tubes in this loudspeaking system is facilitated by the use of separate filters, namely the above-mentioned filters, 471 and 472, for the filament circuits of the microphone amplifier and speaker amplifier, respectively. Due to the use of these separate filters regenerative effects which might otherwise give rise to howling are avoided. In connection with this feature reference is made to United States Patent 2,369,460, to R. H. Herrick.

The operation of the system, Figures 1–4, by means of the handset will first be described. To this end let it be assumed that the subscriber at the telephone station shown in Fig. 3 wishes to make an outgoing call over line L1. The subscriber accordingly lifts his handset, thereby operating cradle switch 75, and then depresses the pick-up key, PU1, associated with line L1. The following loop circuit is now closed over line L1; battery through on winding of the line relay, not shown, in the central office, conductor 70 of line L1, contact 62, conductor 14, transmitter 91, line winding 86 of induction coil 85, impulse springs 81 of dial 80, contact 76 of cradle switch 75, conductor 15, contacts 60 and 61, conductor 74 of line L1, other winding of the line relay, not shown, and ground in the central office. Operation of the line relay causes the first numerical switch, for instance, the selector, not shown, in the central office to be connected to line L1 in the well-known manner so that the subscriber at substation 30 receives dial tone.

The subscriber now dials the number of the desired party by repeatedly actuating his dial, whereby the loop circuit traced above is opened at impulse springs 81 once for each impulse. At dial shunt springs 82, 83 short-circuits are placed during each actuation of the dial across receiver 92 and across transmitter 91 and induction coil winding 86. Resistance 79 and condenser 78, together with contacts 76, 77 of the hookswitch form a spark suppression circuit for the impulse springs.

After all digits have been sent the called subscriber's bell is rung in the usual manner and the last-mentioned subscriber answers the call by lifting the receiver at his substation, not shown. This causes the connector, not shown, in the central office to switch the connection through in a manner well-understood in the art so that the conversation between the two subscribers may begin.

It will be appreciated that transmitter 91 receives battery feed from the central office battery over the loop circuit traced above except that, at this time, battery and ground are fed through the line relay of the connector rather than that of the line circuit is involved. Voice currents generated by transmitter 91 follow two parallel paths one of which extends over line L1 while the other is a local path which may be traced as follows: upper terminal of transmitter 91, Fig. 3, contacts 89, induction coil winding 87, balancing resistance 93 and, in multiple thereto, induction coil winding 88 and receiver 92, and back to the lower terminal of transmitter 91. Winding 88 is connected and designed to act as an anti-sidetone winding; as a result the voltage induced in winding 88 balances the voltage drop across resistance 93 for average line conditions so that no voice current traverses receiver 92. However, this receiver responds to voice currents incoming over line L1, namely due to signal voltages induced in induction coil winding 87 which give rise to the flow of signal current in the following circuit: left terminal of winding 87, Fig. 3, winding 88, receiver 92, transmitter 91, condenser 89, right hand terminal of winding 87.

The Hold key is provided to enable the subscriber at substation 30 to hold a line, for instance, a trunk to a main office, while setting up a connection over another line, for instance, line L2. Regarding the details of this holding feature which are of no pertinence to the present invention, reference is made to D. H. King Patent 2,273,-530. Suffice it to say that upon operation of the holding button one side of the line is opened at contact 60 while at contact 84 conductor 15 is extended by way of contact 63 to the hold relay circuit, not shown, which is associated with the line, in the instant case L1, to be placed on holding.

Upon release of the Hold key the previously depressed pick-up key, PU1, is automatically restored to normal. When the subscriber at the end of his call over line L2, reactuates key PU1 to resume the original conversation over line L1, the hold relay circuit associated with this line returns to its normal condition. At the end of the conversation over line L1 the subscriber at substation 30 replaces the receiver, thereby opening the loop circuit at contact 76 and releasing the switching equipment, not shown, in the central office.

If a call for substation 30 is incoming over one of the lines, for example, L1 then the corresponding ringing signal receiving circuit, in this case 71, responds to the ringing current projected over the subscriber's line by actuating an audible signal, not shown, at or near the substation in the conventional manner; if this audible signal is common to all lines it is usually supplemented by a visual signal identifying the line over which the call has come in. For this purpose, and also for providing a busy indication for each line, each of the pick-up keys may have associated therewith a combination calling-and-busy lamp, these lamps not being shown in Figs. 1 and 3.

The subscriber at substation 30 answers the call by removing his handset and actuating pick-up key PU1. This completes the loop circuit to the central office and causes the transmission of ringing current to be discontinued and the connection to be switched through in the well-known manner. Transmission of voice frequencies from and to this substation subsequently takes place in the manner described above. At the end of the call the subscriber again replaces his handset.

It will now be assumed that the subscriber at substation 30 wishes to set up a loudspeaking connection with another party. The subscriber accordingly depresses "On" button 22, Fig. 2 momentarily without removing the handset and then actuates pick-up key PU1. In response to the actuation of the "On" button switching relay 400, Fig. 4, operates in the following circuit: ground, contact 42 of the "On" button, conductor 9, winding of relay 400, positive terminal of filament supply rectifier 465, negative terminal of this rectifier, ground. As will be seen from an inspection of Fig. 4 rectifier 465 is of the bridge type and is supplied with alternating current through the secondary winding 462 of power transformer 460 the primary winding 461 of which is connected to the A.C. power line. It will also be noted from Figs. 2 and 4 that "On" indicating lamp 29 is connected by way of conductors 9 and 10 and resistance 447 across the winding of relay 400 so that this lamp is lit upon closure of contact 42.

Since "On" button 22 returns to normal as soon as the subscriber releases it the short-circuit momentarily placed across microphone 21 by contacts 41 is without effect. On the other hand, relay 400 upon operation locks in the following circuit: ground, contact 43 of "Off" button 23, conductor 8, contact 405, winding of relay 400, rectifier 465, ground. Due to the ground connection extended via contacts 43 and 405 "On" lamp 29 remains lit after release of "On" button 22.

With relay 400 operated and pick-up key PU1 in actuated condition the following loop circuit is closed: battery and first winding of the line relay, not shown, in the central office, conductor 70 of line L1, contact 62, conductor 14, contact 407 of relay 400, conductor 12, dial impulse springs 81, Fig. 3, conductor 11, contact 408 of relay 400, choke 441, conductor 15, contacts 60 and 61, conductor 74 of line L1, second winding of the line relay, not shown, and ground in the central office.

Upon hearing dial tone the subscriber may now dial the called party's number by correspondingly actuating the dial, 80, in his substation 30. This is made possible by the fact that impulse springs 81 of this dial are included by way of conductors 11, 12 in the loop circuit just traced. It will also be noted that contact 407 acts to place a short-circuit on the transmission equipment of substation 30 which short-circuit may be traced from the right-hand terminal of induction coil winding 86, Fig. 3, by way of conductor 12, contact 407, conductor 14 to the common terminal of transmitter 91 and receiver 92; by means of this short-circuit the transmission equipment of the substation is thus kept from introducing a loss in the loop circuit with the system conditioned for distant-talking operation.

Spark suppression for dial impulse springs 81 in the instant case is provided by resistance 445 and condenser 446, Fig. 4 namely by way of conductors 12 and 11. The closure of dial shunt springs 82, 83 during each actuation of the dial is without effect with the system set up for distant talking. Choke 441 is of low resistance and of relatively low impedance so that this choke may remain included in the loop circuit without harmful effect on the dialling operation.

When relay 400 operated as above described it extended the filament voltage supply from rectifier 465 to filters 471, 472 and common filter condenser 473 at contact 403; and at contact 404 of relay 400 the plate voltage supply was extended to filter 468, namely by way of ground, winding 463 of power transformer 460, contact 404, resistor 466, plate voltage supply rectifier 467, filter 468. As will be observed from Fig. 4, filter 468 supplies plate voltage to tubes 411 and 421 through resistors 413 and 423, respectively; supplies tube 412 with plate voltage through choke 448; and supplies tube 422 with plate voltage through secondary winding 456 of transformer 455. Filter 468 furthermore supplies the screen grids of tubes 411 and 421 with the necessary voltage through resistors 414 and 424, respectively, and supplies the screen grids of tubes 412 and 422 with the required voltage directly.

When relay 400 operated, it also opened at contact 401 a short-circuit normally existing across loudspeaker conductors 17, 18 and at contact 402 furnished ground to conductor 13. This last-mentioned conductor is not used in the instant case but may be employed in connection with substations of a type requiring a ground connection, for example to a special service key, which is to be closed only while the system is in use.

After the connection to the distant party has been completed and switched through in the central office the subscriber at substation 30 may begin conversing with the other party, namely through his microphone 21, Figs. 1 and 2, and loudspeaker 45, Fig. 1. Signal voltages produced by microphone 21 are impressed on primary winding 451 of transformer 450 by way of conductors 1, 2 and the corresponding signal voltages induced in secondary winding 452 of this transformer are impressed on control grid 415 of input tube 411 of the microphone amplifier. The ground connections to the housing of microphone 21 and to the midpoint of winding 451 are provided for balancing purposes only. After amplification in both stages 411, 412 of this amplifier the microphone signal is reproduced in winding 435 of hybrid coil 430, this last-mentioned winding, in series with condenser 449, being connected across choke coil 448 which as mentioned above is included in the plate voltage supply circuit of tube 412. From winding 435 the signal is then induced in windings 431 to 434 of hybrid coil 430 all of these windings, together with balancing network 438, 439, being serially connected across choke coil 441 which is included in the loop circuit. In this manner the amplified signal from microphone 21 is transmitted over line L1.

Assuming that network 438, 439 substantially balances the impedance of line L1, the signal voltage between the junction point of windings 431, 432 and the junction point of windings 433, 434 is zero or negligible so that the amplified microphone signal does not reach volume control potentiometer 24, Fig. 2, by way of conductors 3, 4. Hence, this signal does not reach the primary winding 443 of transformer 442 which winding is connected across conductors 4 and 5, that is, across the right-hand terminal and the slider of potentiometer 24. Since, therefore, the signal originating in the microphone is substantially kept from reaching the input of the speaker amplifier, howling due to any acoustic feedback that may exist between loudspeaker and microphone is prevented.

Signal currents incoming over line L1, on the other hand, are impressed on volume control potentiometer 24, namely over the branch circuit extending from the upper terminal of choke 441 through winding 433, conductor 4, winding of potentiometer 24, conductor 3, condenser 437, winding 431, lower branch of choke 441. A greater or lesser amount of this signal depending on the slider setting of potentiometer 24 is thus impressed on primary winding 443 of transformer 442 and from secondary winding 444 of this transformer on control grid 425 of input tube 421 of the speaker amplifier. Since, as mentioned above, primary winding 456 of transformer 455 is included in the plate circuit of output tube 422 of this amplifier, the amplified signal finally is impressed from the secondary winding 457 of this transformer and cable 27 on loudspeaker 45, Fig. 1.

Let it now be assumed that the subscriber at substation 30, with the system conditioned for distant talking as just described, is engaged in a conference in his office and that he does not wish the party at the distant end of the connection to hear what is said around the conference table. In order temporarily to exclude the party at the other end from the local conversation the subscriber again depresses "On" button 22, Fig. 2, whereby contact 41 of this button places a short-circuit across microphone 21. Therefore, as long as the "On" button is held depressed no signal can be picked up by microphone 21 and transmitted over line L1. The transmission of voice currents incoming from the distant substation over line L1, however, is not interfered with so that these voice currents are reproduced in loudspeaker 45, Fig. 1, as before. When the subscriber at substation 30 releases button 22 of the control unit the short-circuit across microphone 21 is removed and speech is again transmitted over line L1 in both directions.

It will now be assumed that the subscriber at telephone station 30, in order to exclude the other persons in his office from his conversation with the distant party, wishes to transfer the system from distant-talking operation to handset operation. The subscriber accordingly lifts his handset 34, Fig. 1, from the cradle and then depresses nonlocking "Off" button 23, Fig. 2 momentarily. When ground is thus disconnected from conductor 8 at contact 43 the above-traced locking circuit of switching relay 400 is broken so that this relay is permitted to release and "On" lamp 25 which is connected across the winding of relay 400 is simultaneously extinguished.

Relay 400 in releasing restores miscellaneous-equipment unit Fig. 4 to its normal circuit condition. More particularly, the two voltage supply circuits to the amplifier assembly are opened at contacts 403 and 404 respectively; another point in the locking circuit of relay 400 is opened at contact 405; at contact 401 loudspeaker conductors 17, 18 are short-circuited to prevent clicks from being heard in the loudspeaker during the cooling-off period of the amplifier tubes; the short-circuit across the transmission equipment in substation 30 is removed at contact 401; and the branch of the loop circuit including choke coil 441 interrupted at contact 408. However, inasmuch as the handset was removed prior to the depression of "Off" button 23 an alternative branch of the loop circuit has already been completed at switchhook contact 76. This new loop may be traced from conductor 70 via contact 62, conductor 14, transmitter 91, winding 86 of induction coil 85, contacts 81 and 76, conductor 15, contacts 60 and 61 to conductor 74. Since, therefore, no interruption of the loop circuit extending over line L1 takes place the switching equipment in the central office is held during and after the transfer operation. Transmission of voice currents now takes place in the same manner as explained above in connection with handset operation of the present system.

If the subscriber at substation 30 wants to switch the system back to distant talking he may again depress "On" button 22 momentarily and thereafter replace the handset. Relay 400, therefore, again operates and locks so that the circuit now is in the same condition as explained above for distant-talking operation. Attention is invited to the fact that because of the absence of a mechanical inter-lock between the pick-up keys and the hookswitch, pick-up key PU1 is stil lin actuated condition after the handset has been replaced incident to the last-mentioned transfer to loudspeaking operation.

At the end of the conversation the subscriber at telephone station 30 momentarily depresses "Off" button 23 whereby switching relay 400 is again permitted to release as described above. Since no alternative branch circuit is available at this time the loop circuit extending over line L1 is opened upon the opening of contact 408 of relay 400. With the subscriber's loop opened the switching equipment in the central office is also returned to normal.

From the foregoing description it will be understood that an incoming call received over any of the lines, for example line L1, may be answered by merely actuating the corresponding pick-up key, if it is not already in actuated condition, and further depressing "On" button 22, whereupon conversation may be carried on by means of microphone 21 and loudspeaker 45. It will also be appreciated that a call originated or answered in the conventional manner, that is, by means of the handset, may later be switched to "distant-talking" by operation of "On" button 22, Fig. 2 and subsequent replacing of the handset.

The circuit arrangement of control unit 20 and miscellaneous-equipment unit 40 is such that these two units may be used in conjunction with virtually any single-line central-battery substation of modern design and may also be used with practically any modern multi-line central-battery substation, provided that there is no inter-lock between hookswitch and pick-up keys. This means that by the mere addition of control unit 20, miscellaneous-equipment unit 40 and loudspeaker 45, selective loudspeaking service may be added as a later attachment, to any of the foregoing substations.

Figure 5:
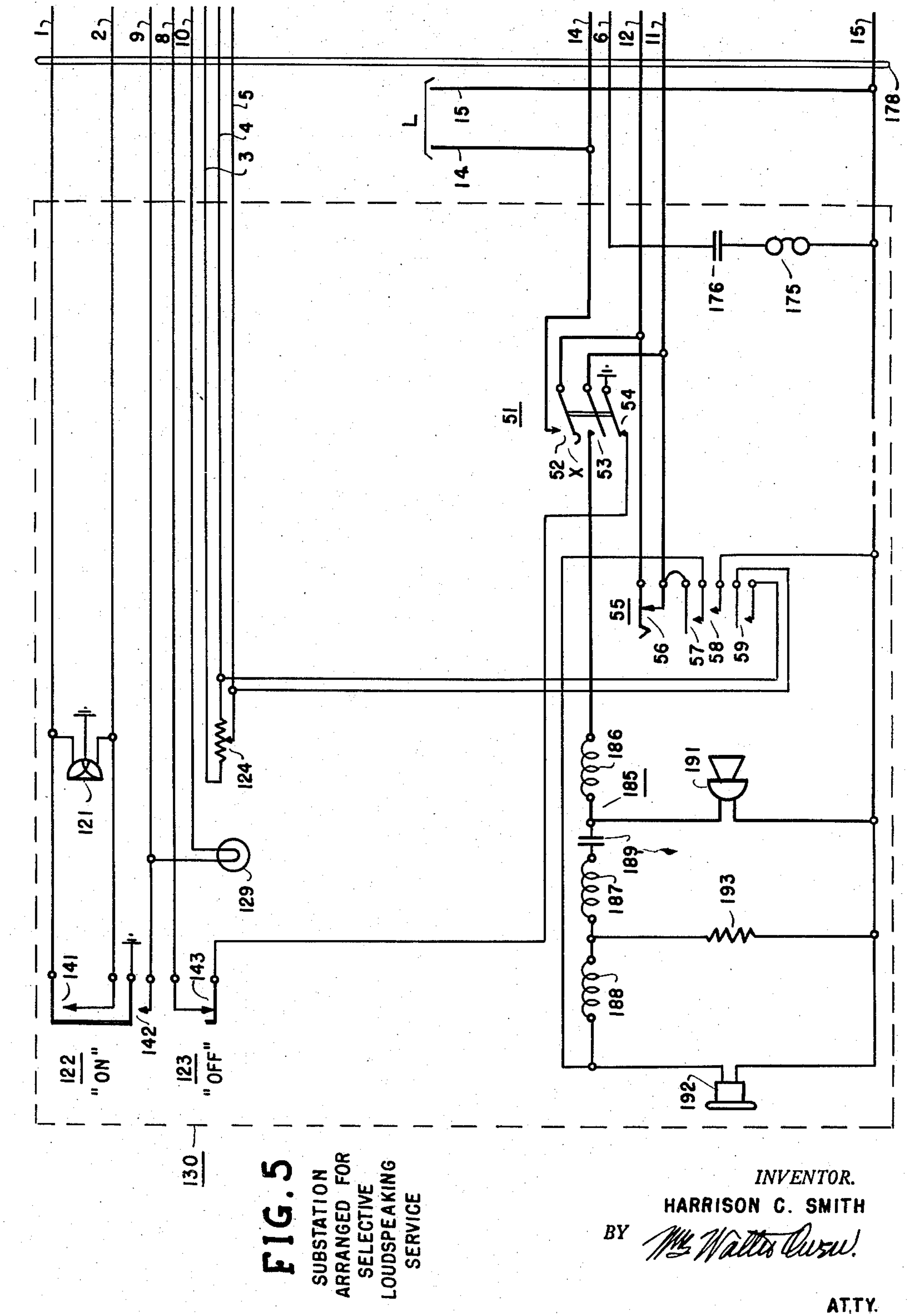
Fig. 5 illustrates the second embodiment of the invention. More particularly.

Fig. 5 illustrates the second embodiment of the invention wherein a single-line substation especially designed for selective loudspeaking service is employed. This substation, designated 130 in Fig. 5, incorporates therein components similar to those which are included in the control unit, Fig. 2, used in the embodiment previously described. In the instant case these components are mounted in the front portion of the subset itself; for example, microphone 121, "On" button 122 and "Off" button 123 may be mounted below the dial and "On" lamp 129 and volume control 124 above the dial. The substation is connected by way of line L to the central office and is further connected via cable 178 with the miscellaneous-equipment unit shown in Fig. 4, the latter unit, in turn, being connected by way of cable 27 with a loudspeaker similar to speaker 45, Fig. 1.

The transmission equipment of substation 130, Fig. 5, includes anti-sidetone induction coil 185 having windings 186, 187 and 188 and condenser 189, balancing resistance 193, transmitter 191 and receiver 192, these components being inter-connected in the same manner as in Fig. 3 and the line equalizing means again being omitted in the circuit shown. There are, however, some differences between Figs. 5 and 3 in regard to the arrangement of the switchhook springs and dial springs. Furthermore, while no spark protection equipment for the dial impulse springs is included in the substation, Fig. 5, this subset does include a ringer 175 and ringer condenser 176.

Let it first be assumed that the subscriber at telephone station 130 wishes to initiate a call in the regular manner. After the subscriber has lifted his handset from the cradle the following loop circuit is closed over line L: battery, first winding of the line relay, not shown, in the central office, conductor 14, contact 52 of switchhook 51, dial impulse springs 56, switchhook contact 53, winding 186 of induction coil 185, transmitter 191, conductor 15, second winding of the line relay, not shown, ground.

Upon receiving dial tone from the central office in the usual manner the subscriber proceeds to set up the connection by actuating his dial 55. Resistance 445 and condenser 446 in the miscellaneous-equipment unit which are bridged across impulse springs 56 by way of conductors 12 and 11 provide spark protection. During each actuation of the dial transmitter 191 and winding 186, and also receiver 192, are shorted at dial shunt springs 57, 58 while shunt springs 59 are without effect at this time.

Upon switch-through of the connection in the central office voice currents are transmitted in both directions in a manner similar to that described above for substation 30, Fig. 3. At the end of the conversation the subscriber replaces his handset, thereby opening the loop circuit at contacts 52, 53 and thus releasing the switching equipment in the central office.

In the case of a call incoming to substation 130 ringing current projected over line L actuates ringer 185 over a circuit including conductor 14, contact 406, Fig. 4, conductor 6, condenser 176, ringer 175, and conductor 15. The called subscriber at substation 130 answers the call by lifting his receiver. The further functioning of substation 130 in connection with this call will be understood from the preceding description.

It will now be assumed that the subscriber at telephone station 130 wishes to set up a loudspeaking connection with the distant party and that he, therefore, initiates the call by means of "On" button 122 rather than by lifting his handset. Responsive to the closure of contact 142 of the "On" button switching relay 400 operates and "On" lamp 129 is lit in the manner described above in connection with the first embodiment. In the present case the locking circuit of relay 400 extends from ground at switchhook contact 54, Fig. 5, by way of contact 143, conductor 8, contact 405, winding of relay 400 to the positive terminal of rectifier 465. Relay 400 also places the following loop across line L: conductor 14 of line L, contact 407, conductor 12, impulse springs 56, conductor 11, contact 408, choke 441, conductor 15. It will be noted that in the present instance contact 407 has a function similar to that of switchhook contact 52 and contact 408 a function similar to that of switchhook contact 53. At contact 406 ringer 175 is disconnected to improve transmission.

As the dial impulse springs 56 are included in the loop circuit just described the subscriber, upon receiving dial tone, may again set up the connection by actuating the dial, 55, in his subset. Resistance 445 and condenser 446 provide spark suppression for the impulse springs. During each actuation of the dial, dial shunt springs 59 place a short-circuit via conductors 4 and 5 across primary winding 443 of input transformer 442. This will tend to eliminate any remaining traces of dial clicks, however minute, that might conceivably appear in the loudspeaker under adverse conditions. After the call has been completed and switched through transmission by means of microphone 121 and over the loudspeaker connected to cable 27, Fig. 4, takes place substantially in the same manner as explained above for the first embodiment.

If the subscriber at substation 130 wishes to exclude the distant party from overhearing what is being said in the subscriber's office he again depresses "On" button 122, thereby at contact 141 short-circuiting microphone 121. Therefore, as long as the "On" button is held depressed no outgoing speech signal will be transmitted over line L. After release of the "On" button the system is again conditioned for two-way transmission.

At the end of the conversation with the distant party the subscriber releases the connection by depressing "Off" button 123 whereby the above-traced locking circuit of relay 400 is opened at contact 143. Relay 400 accordingly releases and lamp 124 is extinguished. Upon restoration of switching relay 400 the loop circuit is opened at contacts 407 and 408 and both the switching equipment in the central office and the loudspeaking system itself are returned to normal condition.

If the subscriber, with the system still conditioned for loudspeaking operation, that is, with relay 400 operated, wishes to continue his conversation by means of the handset he may in the instant case simply remove the receiver without depressing the "off" button. This is made possible by the fact that switchhook contact 54 is included in the locking circuit of relay 400 as mentioned above. The timing is such that the loop branch including conductor 14, switchhook contacts 52 and 53, winding 186, transmitter 191 and conductor 15 is closed before the original loop circuit including choke coil 441 is opened at contacts 407 and 408 upon the release of relay 400.

It will be understood, of course, that subsequently the system may again be transferred to loudspeaking operation by actuation of the "On" button. In this case "On" button 122 is held depressed until the handset has been restored. This is to insure that the locking circuit for relay 400 is prepared at hookswitch contact 54 before button 122 is released.

While only certain embodiments of the invention have been illustrated and described it is to be understood that numerous modifications in the details of arrangement may be resorted to without departing from the true spirit and scope of the invention as defined in the appended claims.

What is claimed is:

1. A loudspeaking telephone system comprising a line, a transmitter and receiver both connected to said line, a microphone and an amplifier therefor, a speaker and an amplifier therefor, means for coupling said microphone and speaker amplifiers with said line, substantially without permitting signal transmission from one amplifier to the other, and control means including a manually actuable switch including a first contact to complete a circuit, for causing said coupling means, in lieu of said transmitter and receiver, to be effectively connected to said line, said manual switch including a second contact for disabling said microphone, said disablement of said microphone permitting the exclusion of the party at the distant end of a telephone connection from any conversation taking place within reception range of said microphone.

2. A loudspeaking telephone system comprising a line, an induction coil connected to said line, a transmitter and receiver both connected to said induction coil, a microphone and an amplifier therefor, a speaker and an amplifier therefor, hybrid means interconnecting said two amplifiers, and control means including a manually actuable switch including a first contact to complete a circuit, for causing said hybrid means, in lieu of said induction coil, to be effectively connected to said line for the transmission and receipt of voice frequencies thereover, said manual switch including a second contact for disabling said microphone, said disablement of said microphone permitting the exclusion of the party at the distant end of a telephone connection from any conversation taking place within reception range of said microphone.

3. A loudspeaking telephone system comprising a subscriber line, a substation with a handset including a transmitter and receiver and with a hookswitch controlling the connection of both said transmitter and receiver to said line, said system also comprising a microphone and an amplifier therefor, a speaker and an amplifier therefor, means for coupling said microphone and speaker amplifiers with said line, substantially without permitting signal transmission from one amplifier to the other, and a manually actuable switch including two contacts, one of said contacts being effective upon actuation of said switch to cause said coupling means to be connected to said line and the other contact being effective to disable said microphone while said manual switch is actuated.

4. A loudspeaking telephone system comprising a subscriber line, a subset mounting a hookswitch carrying a handset, said handset including a transmitter and receiver and said hookswitch controlling the connection of both said transmitter and receiver to said line, said system also comprising a microphone and an amplifier therefor, a speaker and an amplifier therefor, means for coupling said microphone and speaker amplifiers with said line, substantially without permitting signal transmission from one amplifier to the other, a manually actuable switch of the non-locking type including a first contact to complete a circuit to a control relay, said relay being operated upon actuation of said manual switch to close a locking circuit for itself and connect said coupling means to said line, and said manual switch including a second contact while actuated being effective to disable said microphone said disablement of said microphone permitting the exclusion of the party at the distant end of a telephone connection from any conversation taking place within reception range of said microphone.

5. A loudspeaking telephone system as defined in claim 4, wherein the locking circuit of said relay is controlled by said hookswitch so that said relay, in releasing incident to the removal of said handset, automatically disconnects said coupling means from said line.

6. A loudspeaking telephone system as defined in claim 4 and also comprising a microphone cabinet separate from said subset, said cabinet mounting said manual switch in addition to said microphone.

References Cited in the file of this patent

UNITED STATES PATENTS

| | | |
|---|---|---|
| 2,375,791 | Johnson | May 15, 1945 |
| 2,786,099 | Beatty | Mar. 19, 1957 |
| 2,801,287 | Clemency | July 30, 1957 |